US009890995B2

(12) United States Patent
Arav

(10) Patent No.: US 9,890,995 B2
(45) Date of Patent: Feb. 13, 2018

(54) DEVICES AND METHODS FOR PRODUCING LIQUID AIR

(71) Applicant: FERTILESAFE LTD, Nes Ziona (IL)

(72) Inventor: Amir Arav, Tel Aviv (IL)

(73) Assignee: Fertilesafe LTD, Nes Ziona, IL (US)

( * ) Notice: Subject to any disclaimer, the term of this patent is extended or adjusted under 35 U.S.C. 154(b) by 0 days.

(21) Appl. No.: 14/609,458

(22) Filed: Jan. 30, 2015

(65) Prior Publication Data

US 2015/0143844 A1    May 28, 2015

Related U.S. Application Data

(63) Continuation of application No. PCT/IL2014/050399, filed on May 1, 2014.

(60) Provisional application No. 61/889,686, filed on Oct. 11, 2013.

(51) Int. Cl.
| | |
|---|---|
| *F25B 19/00* | (2006.01) |
| *F25J 1/00* | (2006.01) |
| *F25J 1/02* | (2006.01) |
| *B01D 5/00* | (2006.01) |

(Continued)

(52) U.S. Cl.
CPC .......... *F25J 1/0012* (2013.01); *B01D 5/0003* (2013.01); *B01D 53/002* (2013.01); *F25J 1/0221* (2013.01); *F25J 1/0251* (2013.01); *F25J 1/0276* (2013.01); *B01D 53/261* (2013.01); *B01D 2253/102* (2013.01); *B01D 2253/20* (2013.01); *B01D 2257/80* (2013.01); *B01D 2257/91* (2013.01); *B01D 2258/06* (2013.01); *B01D 2259/804* (2013.01); *F25J 2210/42* (2013.01)

(58) Field of Classification Search
CPC ........ B01D 5/00; B01D 5/0003; B01D 53/00; B01D 53/002; F25J 1/0012; F25J 1/0221; F25J 1/0276; F25J 2221/014; F25J 2221/031; F25J 2223/0123; F25J 2225/013; F25J 2227/0341; F25J 2227/0337
See application file for complete search history.

(56) References Cited

U.S. PATENT DOCUMENTS

| | | |
|---|---|---|
| 4,314,459 A | 2/1982 | Rivoire |
| 4,410,035 A | 10/1983 | White |
| 4,530,708 A | 7/1985 | Nakazato et al. |

(Continued)

FOREIGN PATENT DOCUMENTS

| | | |
|---|---|---|
| CA | 2837934 | 7/2014 |
| EP | 0872250 | 10/1998 |

(Continued)

OTHER PUBLICATIONS

Mark G. Larman, Vitrification of mouse embryos with super-cooled air, Mar. 15, 2011, Fertility and Sterility vol. 95, No. 4.

(Continued)

*Primary Examiner* — Keith Raymond
*Assistant Examiner* — Webeshet Mengesha
(74) *Attorney, Agent, or Firm* — Neil D. Gershon

(57) ABSTRACT

Methods and devices for continuously producing liquid air. One embodiment includes bringing a first container confining an unpressurized first volume coupled to outer air in contact with a first cryogenic medium, and maintaining a temperature of the first cryogenic medium substantially higher than the boiling temperature of the first cryogenic medium for affecting continuous production of liquid air.

19 Claims, 5 Drawing Sheets

(51) Int. Cl.
*B01D 53/00* (2006.01)
*B01D 53/26* (2006.01)

(56) References Cited

U.S. PATENT DOCUMENTS

| | | | |
|---|---|---|---|
| 4,590,770 A | 5/1986 | Howard | |
| 4,620,962 A | 11/1986 | Brodbeck | |
| 4,759,848 A | 7/1988 | Segura et al. | |
| 4,782,655 A | 11/1988 | Weber | |
| 5,129,446 A | 7/1992 | Beamer | |
| 5,339,641 A | 8/1994 | Mathis et al. | |
| 5,501,080 A * | 3/1996 | McManus | B01D 8/00 62/235.1 |
| 5,548,962 A | 8/1996 | Luger et al. | |
| 5,638,698 A | 6/1997 | Knight et al. | |
| 5,701,745 A | 12/1997 | Cheng et al. | |
| 5,737,926 A | 4/1998 | Chen | |
| 5,804,760 A * | 9/1998 | Flynn | 149/109.6 |
| 6,155,078 A | 12/2000 | Miyashita et al. | |
| 6,505,472 B1 | 1/2003 | Cheng et al. | |
| 6,578,367 B1 | 6/2003 | Schaefer et al. | |
| 6,758,212 B2 * | 7/2004 | Swann | A62B 17/04 128/201.25 |
| 8,794,015 B1 | 8/2014 | Dahlen et al. | |
| 2005/0139611 A1 * | 6/2005 | Kubo | B65D 47/06 222/189.06 |
| 2005/0155378 A1 | 7/2005 | Gershtein et al. | |
| 2009/0306610 A1 * | 12/2009 | Van Den Heuvel | A61F 5/451 604/317 |
| 2010/0154470 A1 | 6/2010 | Nilsen | |
| 2012/0065610 A1 * | 3/2012 | Seifert | A61J 1/2089 604/406 |
| 2012/0298145 A1 * | 11/2012 | Rife | 134/22.18 |

FOREIGN PATENT DOCUMENTS

| | | | | |
|---|---|---|---|---|
| EP | 2369280 | * | 9/2011 | F25D 3/10 |
| WO | WO9808039 | | 2/1998 | |
| WO | WO2009029749 | | 3/2009 | |
| WO | WO2010070432 | | 6/2010 | |

OTHER PUBLICATIONS

A. Bielanski, A review of the risk of contamination of semen and embryos during cryopreservation and measures to limit cross-contamination during banking to prevent disease transmission in ET practices, Jul. 29, 2011, Theriogenology 77.

A. Bielanski, Microbial contamination of embryos and semen during long term banking in liquid nitrogen, Dec. 6, 2002, Cryobiology 46.

International Search Report PCT/IL2014/050399.

* cited by examiner

DEVICES AND METHODS FOR PRODUCING LIQUID AIR

FIELD OF THE INVENTION

The invention relates to the field of cryogenics. More precisely, the invention relates to the production of liquid air.

BACKGROUND

Cryogenic media such as liquid nitrogen or liquid air are utilized in cryopreservation for preserving biological samples at a very cold temperature (e.g. 196 degree Celsius below zero). According to some vitrification protocols, the biological sample, e.g. an oocyte or an embryo, is plunged the cryogenic medium, thus resulting in very high cooling rates, which facilitates vitrification rather than crystallization of the intracellular and intercellular liquids. Cryogenic media such as liquid nitrogen or liquid air may also have culinary applications, for example in preparing ice-creams and cold cocktails. However, commercially available cryogenic media, such as liquid nitrogen, are in many cases not sufficiently clean for those applications.

In cryopreservation, biological samples stored in liquid nitrogen might be contaminated with viruses, germs, fungi and spores. In some cases, contamination might be due to contaminations already residing in the liquid nitrogen when supplied to the laboratory. Additionally or alternatively, contamination might also be due to cross-contamination between samples.

The potential of disease transmission and pathogen survival through contaminated cryogenic medium has been proposed by many authors and the evidence of contamination in human patients has been described for different pathogens. For example, the publication "Microbial contamination of embryos and semen during long term banking in liquid nitrogen" (Bielanski A, Bergeron H, Lau P C, Devenish J. Cryobiology 2003; 46:146-52), reports on microbial contamination of embryos and semen cryopreserved in sealed plastic straws and stored for 6-35 years in liquid nitrogen.

Therefore, the use of safe cryopreservation protocols is important to prevent potential contamination of the biological samples by the cryogenic medium.

SUMMARY

The present invention, in some embodiments thereof, relates to the production of liquid air. The invention, in some embodiments thereof, relates to a device for producing liquid air, comprising: a first container comprising: a first boundary confining a first volume, the first boundary configured to conduct heat from an inner side of the first boundary to an outer side thereof; and a first opening coupling the first volume with outer air external to the first volume, the first opening is configured to allow flow of outer air into the first volume; the device is configured to continuously produce liquid air by bringing the first container in contact with a first cryogenic medium, thereby condensing a portion of inner air internal to the first volume, while a pressure of the internal air is substantially equal to a standard atmospheric pressure.

In some embodiments of the device a cryogenic temperature of the first cryogenic medium is higher than a boiling temperature of helium.

In some embodiments the device further comprising: a second container, the second container comprises a second volume configured to contain the first cryogenic medium. In some embodiments the device further comprising: a filter configured to filter out contaminating elements from the outer air flowing into the first volume. In some embodiments of the device the filter is a HEPA (High Efficiency Particulate Air) filter. In some embodiments the device is capable of producing liquid air which is cleaner than the cryogenic media. In some embodiments of the device the filter comprises a HEPA filter, a porous filter, and an absorbing filter. In some embodiments of the device the filter and the first container are mutually configured so that the filter fits into the first container, thereby substantially preventing auxiliary flow of unfiltered air into the first volume. In some embodiments of the device the first container comprises a filter adaptor that is configured to fit the filter. In some embodiments of the device the second container is thermally isolated. In some embodiments of the device the second container comprises a first thermal isolation configured to reduce heat transfer from a surrounding environment into the first cryogenic medium. In some embodiments of the device the second container comprises a second outlet configured to facilitate flow of gas from the second container. In some embodiments of the device the second container comprises a second opening configured to facilitate inserting the first container therein, thereby immersing the first container in the cryogenic medium. In some embodiments the device is coupleable to a third container, and is configured to transfer the liquid air from the first container to the third container, while first container is immersed in the first cryogenic medium. In some embodiments the device comprises a first outlet comprising a proximal end coupled to the first volume and a distal end coupleable to the third container, the first outlet configured to conduct the liquid air from the first container into the third container.

The invention, in some embodiments thereof, relates to a method for continuously producing liquid air, the method comprising: bringing a first container confining an unpressurised first volume coupled to outer air in contact with a first cryogenic medium; and maintaining a temperature of the first cryogenic medium substantially higher than the boiling temperature of the first cryogenic medium for affecting continuous production of liquid air.

In some embodiments the method further comprising: filtering out contaminating elements from the outer air flowing into the first volume. In some embodiments the method further comprising: transferring the liquid air from the first container to a third container. In some embodiments the method further comprising: maintaining a level of the first cryogenic medium sufficient for affecting continuous production of liquid air. And in some embodiments of the method maintaining the level of the first cryogenic medium comprises supplementing first cryogenic medium.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION

In the following description some components are "common components", i.e. components that embodiments thereof are illustrated in more than one figure. For example, a first container is a common component whose embodiments are illustrated in FIGS. 1, 2, 3, and 5. Generally, if there is a common component referred to as a "first common component", then embodiments of the first common component illustrated in more than one figure may be similar or different non-limiting embodiments thereof. For example, each embodiment of the first container illustrated in FIGS. 1, 2, 3, and 5 is considered to be a non-limiting example of a first container. Furthermore, an embodiment of the first container illustrated in any one of these figures (out of FIGS. 1, 2, 3, and 5) may be similar to or different from an embodiment of the first container illustrated in any other of these figures (out of FIGS. 1, 2, 3, and 5).

Figure 5:
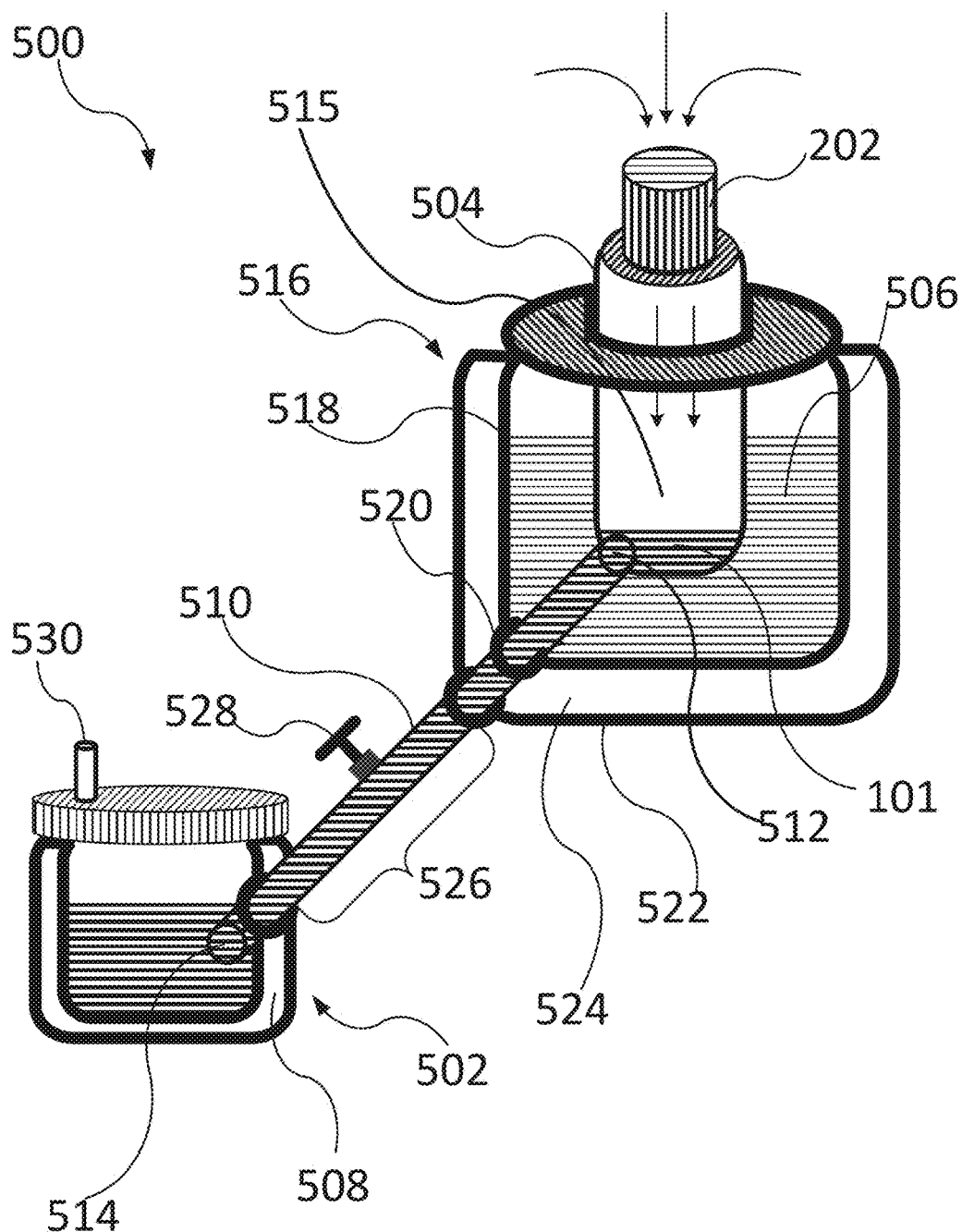
FIG. 5 schematically illustrates a device for producing liquid air, the device coupleable to a third container, according to certain embodiments of the invention.

In some cases, an embodiment of a common component may be denoted in different figures by the same reference numeral. In other cases, an embodiment of a common component may be denoted in different figures by the different reference numerals. For example, the first container is denoted in FIGS. 1, 2, and 3 by 102, and is denoted in FIG. 5 by 504. In some cases, a different reference numeral is utilized in order to indicate that one or more structural and/or functional aspects of an embodiment of a second common component described with reference to a figure do not necessary apply to embodiments of the second common component described with reference to other figures. For example, the first container is denoted in FIGS. 1, 2, and 3 by 102, and is denoted in FIG. 5 by 504, since the embodiment of the first container is illustrated in FIG. 5 to be coupleable to outlet 510, an aspect which does not necessarily apply to the embodiments of first container illustrated in FIGS. 1, 2, and 3.

The invention discloses various embodiments of devices and methods for producing liquid air. The devices and the methods for producing liquid air are briefly referred herein as "the devices" and "the methods". The term "liquid air" refers herein to a composition comprising one or more of the major constituents of the atmosphere (e.g., Nitrogen, Oxygen, and Argon) in liquid state.

Figure 1:
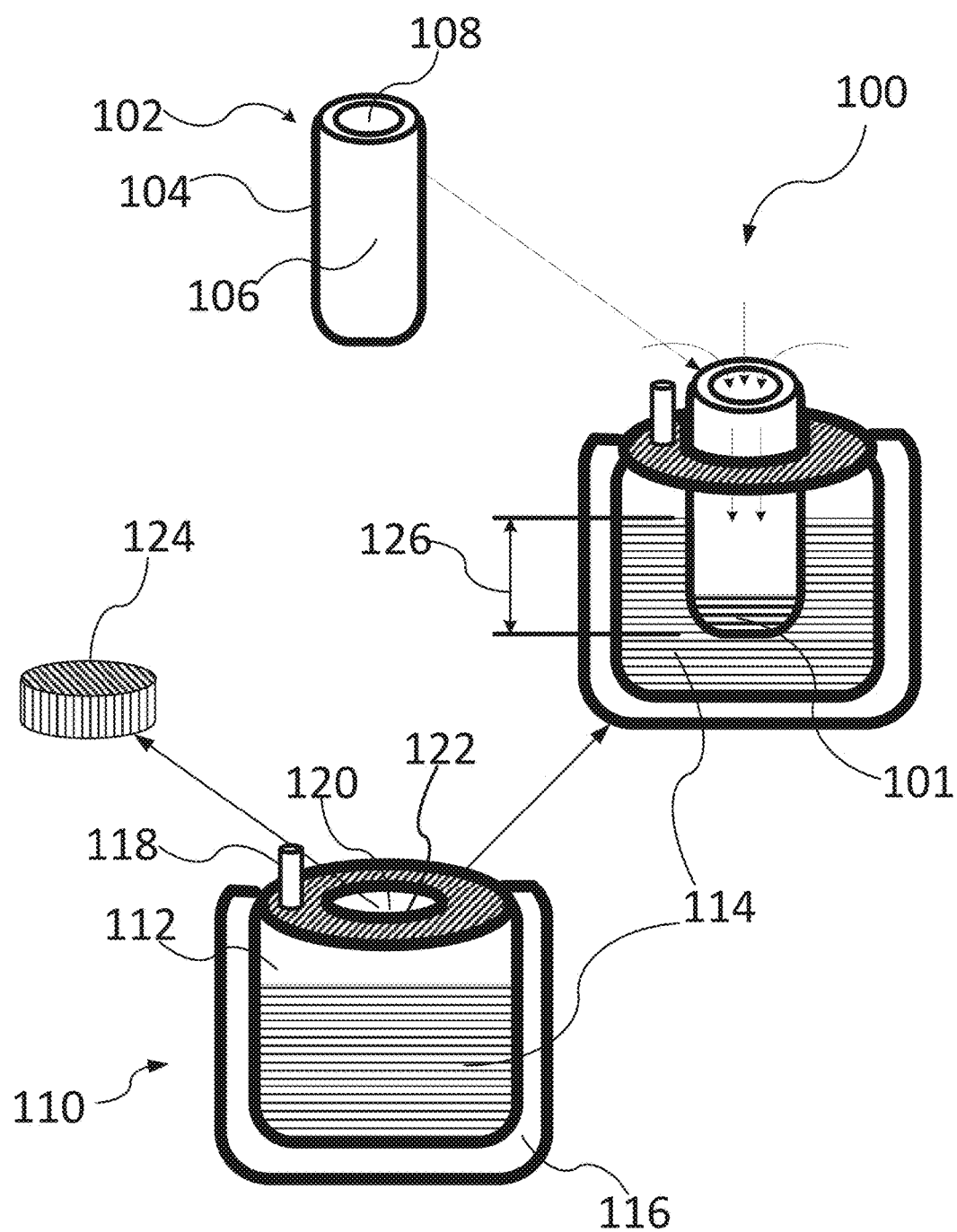
FIG. 1 schematically illustrates a device for producing liquid air, according to certain embodiments of the invention.

FIG. 1 schematically illustrates a device 100 for producing liquid air 101, according to certain embodiments of the invention. Device 100 comprises a first container 102 comprising a first boundary 104 confining a first volume 106. Air internal to the first volume is referred to herein as "inner air". The first boundary is configured to conduct heat from an inner side to an outer side of the boundary, thereby cooling the inner air and allowing condensation of a portion thereof. The terms "condensing/condensation" are defined herein to mean "transforming/transformation from a phase (state) of gas into a phase (state) of liquid". The terms "liquefying/liquefaction" may also be used herein as a synonyms for "condensing/condensation".

In some embodiments the first boundary comprises thin walls, in order to improve heat transfer between sides thereof. For the same purpose, in additional or alternative embodiments, the first boundary comprises walls made of metal characterized by high thermal conductivity, such as steel, copper, aluminum, or any other metal appropriate for the case. In some embodiments, for example, the first boundary comprises a metal wall (e.g. steel wall) which is 1 millimeter thick. In some embodiments, the wall may comprise non-metal material characterized by high heat conductivity, such as glass, high density plastic, or any other material appropriate for the case. It is noted that the term "wall" is not restricted herein to "side-walls". Similar to the term "cell wall" in biology, the term "wall" may refer herein to any applicable part of a boundary (e.g. side-walls, floor, ceiling, etc.).

The first container comprises a first opening 108, which couples first volume 106 with outer air external to the first volume, and allows flow of outer air into the first volume. It is noted that when an amount of air is condensed, the final volume of the amount of air after condensation is approximately 0.0014 of the initial volume of the amount of air before condensation. Therefore, when a portion of x milliliter of the inner air is condensed, about x times 0.9986 milliliter of outer air flows into the first volume and occupies the volume evacuated when the x milliliter of the inner air is condensed. Accordingly, approximately 71 litters of external air flow into the first volume during a period when the device produces 100 milliliters of liquid air.

It is further noted that since the first volume is coupled to the outer air via the first opening, since the pressure of the outer air is atmospheric pressure, and since outer air flows into the first volume, an internal pressure within the first volume is substantially equal to an atmospheric pressure (The term "atmospheric pressure" refers herein to an atmospheric pressure in a location where the device is located). Herein "substantially equal" means that the pressure of the inner air may still deviate from the pressure of the outer air, as long as the deviation is not created by actively compressing or decompressing the inner air, e.g., by using a compressor. Accordingly, device 100 is configured to produce liquid while the internal pressure of the inner air is substantially not higher than the atmospheric pressure.

Device 100 is configured to produce liquid air by passively cooling the inner air. The term "passive cooling" refers herein to bringing a first object in thermal contact with a second object, which is colder than the first object, thereby facilitating passive heat transfer from the first object to the second object. Specifically, device 100 is configured to facilitate production of liquid air by bringing first container 102 in direct or indirect thermal contact with a first cryogenic medium 114, thereby passively cooling the inner air and condensing a portion thereof. In some embodiments, the contact of first container 102 with first cryogenic medium 114 is facilitated by immersing the first container in the first cryogenic medium, as illustrated in FIG. 1. However, this example is non-limiting, and other embodiments may be applicable as well, such as bringing a portion of the first boundary in contact with the first cryogenic medium, or bringing the first boundary in contact with a suitable material adjacent to the cryogenic medium, or any other embodiment suitable for the case.

In some embodiments, the first cryogenic medium comprises liquid nitrogen. In some embodiments, the first cryogenic medium comprises liquid air. However, the above examples of cryogenic media are not restricting, and any other cryogenic medium suitable for the case, such as super cooled liquid nitrogen (i.e. liquid nitrogen cooled below its freezing point), may be utilized.

A maximum amount of liquid air which can be produced by device 100 during a given period is referred herein as an "output capacity" of the device. The output capacity of device 100 is at least 10 milliliter within 10 minutes. In some embodiments, the output capacity of the device is at least 20 milliliter within 10 minutes, and in some embodiments, the output capacity of the device is at least 50 milliliter within 10 minutes.

The output capacity of device 100 depends on a temperature of the first cryogenic medium, referred to herein as a "cryogenic temperature". It is noted that air condensation by device 100 is based on passive cooling at a pressure equal to or lower than that of the environmental atmosphere, while cooling is affected by transfer of energy from the liquefying air to the cryogenic medium. It can be appreciated that such transfer of energy may exist, for example, when the cryogenic medium boils. Hence, maintaining the temperature of the first cryogenic medium substantially higher than the boiling temperature of the first cryogenic medium affects continuous production of liquid air, while "substantially higher" indicates that the temperature may even be equal to the boiling temperature, although keeping it stable at this exact level is impractical. Hence it should be realized that the temperature might be even slightly higher, as long as boiling continues. For example, the boiling temperature of liquid nitrogen is 196 degrees Celsius below zero and in certain embodiments therefore "substantially higher" mean any temperature at the range between 196 degrees Celsius below zero and 180 degrees Celsius below zero, 181 degrees Celsius below zero, or any other number applicable to the case, as long as the cryogenic media can be kept boiling within the device.

In some embodiments, the output capacity of device 100 is at least 10 milliliter within 10 minutes, even in cases where the cryogenic temperature is higher than the boiling temperature of helium (269 degrees Celsius below zero). In some embodiments, the output capacity of device 100 is at least 10 milliliter of liquid air produced within 10 minutes, even in cases where the cryogenic temperature is equal to or higher than the melting temperature of nitrogen (209 degrees Celsius below zero). In some embodiments, the output capacity of device 100 is at least 10 milliliter within 10 minutes, even in cases where the cryogenic temperature is equal or higher than the boiling temperature of nitrogen (196 degrees Celsius below zero). In some embodiments, the output capacity of device 100 is at least 20 milliliter within 10 minutes, even in cases where the cryogenic temperature is equal or higher than the boiling temperature of nitrogen (196 degrees Celsius below zero). In some embodiments, the output capacity of device 100 is at least 50 milliliter within 10 minutes, even in cases where the cryogenic temperature is equal or higher than the boiling temperature of nitrogen (196 degrees Celsius below zero).

The output capacity of the device further depends on the thermal conductivity of the walls of the first boundary, and on the thickness thereof, since thinner walls, and walls made of a material with higher thermal conductivity, facilitate better heat transfer from the inner air to the cryogenic medium. The effect of the thermal conductivity on the output capacity was demonstrated in a first experiment, utilizing devices A and B, which comprised first boundaries made of glass and stainless steel, respectively. (It is noted that the thermal conductivity of stainless steel is approximately 20 times greater than that of glass). The cryogenic medium utilized in both devices was liquid nitrogen. The geometric shapes of the first container of both devices were similar: rectangular cuboids of approximately 100 by 150 by 140 millimeter, wherein the 140 millimeter refer to a height of the shape (Throughout the current application, whenever a geometric shape is described by a list of three values, the third value refers to a height of the shape). The output capacity of devices A and B, per 10 minutes, were 1 and 150 milliliter, respectively, demonstrating the great effect of the thermal conductivity on the output capacity of the device.

The device's output capacity depends also on the geometric shape of the first boundary. An important parameter is a height of the first container, and more specifically an effective height thereof, which is the height of a part of the first volume which is in thermal contact with the cryogenic medium. The effective height is denoted in FIG. 1 by 126. The influence of the height on the device's output capacity was demonstrated in a second experiment, utilizing devices C, D and E, characterized by effective heights of 150, 100, and 80 millimeter, respectively. The horizontal cross section of the three devices was similar: a rectangular of approximately 300 by 150 millimeter. The first cryogenic medium utilized by the three devices was liquid nitrogen. The output capacities of devices C, D, and E, per 10 minutes, were 300, 60, and 20 milliliter, respectively, demonstrating the great effect of the effective height on the output-capacity.

In some embodiments, device 100 further comprises a second container 110 comprising a second volume 112 configured to contain the first cryogenic medium. In some embodiments, second container 110 is thermally isolated. In some embodiments, second container 110 comprises a first thermal isolation 116. In some embodiments, first thermal isolation 116 comprises "vacuum-based-isolation" (i.e. two layers separated by a gap which is partially evacuated of air, creating a near-vacuum). In some embodiments, the first isolation comprises an isolating material characterized by low heat conductivity, such as polystyrene foam or any other foam, or any other isolating material appropriate for the case. However, the above examples of the first thermal isolation are non-limiting, and other embodiments, such as a combination of a vacuum-based-isolation and an isolating material, or any other thermal isolation suitable for the case, may be implemented. The first thermal isolation is configured to reduce heat transfer from a surrounding environment (e.g. a room atmosphere) into the first cryogenic medium, thereby facilitate maintaining the first cryogenic medium at low temperature for a longer period. In cases where the first cryogenic medium is liquid nitrogen, for example, reducing heat transfer into the first cryogenic medium reduces transition of liquid nitrogen into gas, thereby prolonging a period when the liquid nitrogen can be used.

In some embodiments the second volume is substantially closed, in order to reduce contact of the room atmosphere with the first cryogenic medium, thereby reducing to minimum direct heat transfer from the room atmosphere to the first cryogenic medium. In this context, the term "substantially closed" means that an amount of heat directly transferred from the room atmosphere to the first cryogenic medium in a given period is at most 10% of an amount of heat indirectly transferred via surrounding walls of the second container. In some embodiments, the substantially closed second container comprises a second outlet 118 configured to facilitate flow of gas out of the second container. For example, in cases where the first cryogenic medium is liquid nitrogen, the cryogenic temperature is maintained by continuous transition of the liquid nitrogen into gas. In some embodiments, second outlet 118 facilitates release of this gas from the second container.

In some embodiments, second container 110 comprises a second opening 120 configured to facilitate inserting the first container therein, thereby immersing the first container in the first cryogenic medium. In some embodiments, second opening 120 comprises a first edge 122 configured to fit the first boundary of the first container, so as to maintain the second container substantially closed when the first container is inserted therein. In some embodiments, first edge 122 comprises an elastic member, which is configured to fit the first boundary by adjusting an internal contour of the first edge to an external contour of the first boundary, thereby maintaining the second container, when the first container is inserted therein, substantially closed.

It is noted that when first container 102 is not inserted through second opening 120, second container 110 is not closed. Therefore, in some embodiments, device 100 further comprises or is coupleable to a closing mechanism 124 configured to facilitate closing the second opening when first container 102 is not inserted therethrough. The closing mechanism may be a lid, a cork, or any other closing mechanism suitable for the case.

In some embodiments, second container 110 further comprises a third opening (not illustrated in FIG. 1), which is configured to facilitate adding first cryogenic medium to the second container, without removing the first container from the second opening. It is noted that in some embodiments, for example in the embodiments discussed below with reference to FIG. 5, device 100 may be utilized without removing the first container from the second opening. It was previously noted that in some applications, the cryogenic temperature is maintained by continuous evaporation of the first cryogenic medium from liquid into gas. Therefore, in some applications the third opening facilitates adding first cryogenic medium to the second container in order to replace the evaporating first cryogenic medium, without removing the first container from the second opening. In some embodiments, the third opening is configured to be closed by a closing mechanism such as a lid, a cork, or any other suitable closing mechanism.

In some embodiments device 100 comprises a holding mechanism configured to hold the first container immersed within the cryogenic medium. It is noted that a portion of the inner air resides in gas state. Therefore, in cases where the first cryogenic medium resides in liquid state, the first container is subject to elevating buoyancy force. In such cases, the holding mechanism is configured to hold the first container immersed within the cryogenic medium, in spite of the buoyancy force. In some embodiments, first edge 122 is configured to apply pressure on the first boundary, thus holding the first container immersed within the cryogenic medium. However, this example, in which first edge 122 operates as a holding mechanism, is non-limiting, and other holding mechanisms, such as a gripper configured to hold the first container, or any other holding mechanism suitable for the case, may be implemented. In some embodiments, device 100 may be configured to facilitate permanent residence of the first container inserted in the second container. In some embodiments, device 100 is configured to facilitate utilization of the liquid air within first container 102, without removing the first container from the second container. In other embodiments, device 100 is configured to facilitate retrieving the liquid air from first container 102 without removing the first container from the second container, for example as explained below with reference to FIG. 5.

The liquid air produced by the device may be used for various applications, referred to herein as "relevant applications". Some of the relevant applications require the liquid air to be clean. The term "clean" indicates herein that the liquid air is sufficiently free from contaminants belonging to a group of one or more relevant contaminants. The relevant contaminants are determined according to the relevant application. For example, a first relevant application of liquid air may be vitrification of a human reproductive sample (e.g. an oocyte and/or an embryo), sometimes utilizing a vitrification method where the sample is directly inserted into liquid air. For this first relevant application, the relevant contaminants comprise bacteria, fungi, and viruses that cause HIV and Hepatitis B and C. A second relevant application may be utilization of liquid air for preparing cocktails and ice creams, wherein the relevant contaminants comprise bacteria, as measured by bio-burden test. The term "sufficiently clean" and "sufficiently free" indicates herein that a concentration of each of the relevant contaminants is maintained below a respective contamination threshold determined according to the respective relevant application. For vitrification, as an example, the contamination thresholds are substantially null, meaning negative results in bioburden test and in HIV, hepatitis B and hepatitis C tests. Herein, the respective concentrations of the relevant contaminants are generally referred to by the term "cleanness", while "clean" indicates that the concentration of each of the relevant contaminants does not exceed the respective contamination threshold.

It is noted that the cleanness of the liquid air produced by device 100 is determined by the cleanness of outer air entering the first volume, and is substantially not affected by the cleanness of cryogenic mediums utilized for the production of the liquid air. (The term "cryogenic media" refer herein to the first cryogenic medium, and may refer also, where applicable, to more cryogenic mediums, for example a second cryogenic medium, as described below, with reference to FIG. 3). Accordingly, device 100 facilitates production of liquid air which may be cleaner than the cryogenic media utilized for the production of the liquid air. This capability of the invention to facilitate production of a liquid air featuring cleanness which is not limited by the cleanness of the first cryogenic medium can be further appreciated by noting that in many cases commercially available cryogenic media are relatively unclean. In some embodiments, high level of cleanness of the outer air entering the first volume is obtained by filtering, as described in the following paragraph, with reference to FIG. 2.

Figure 2:
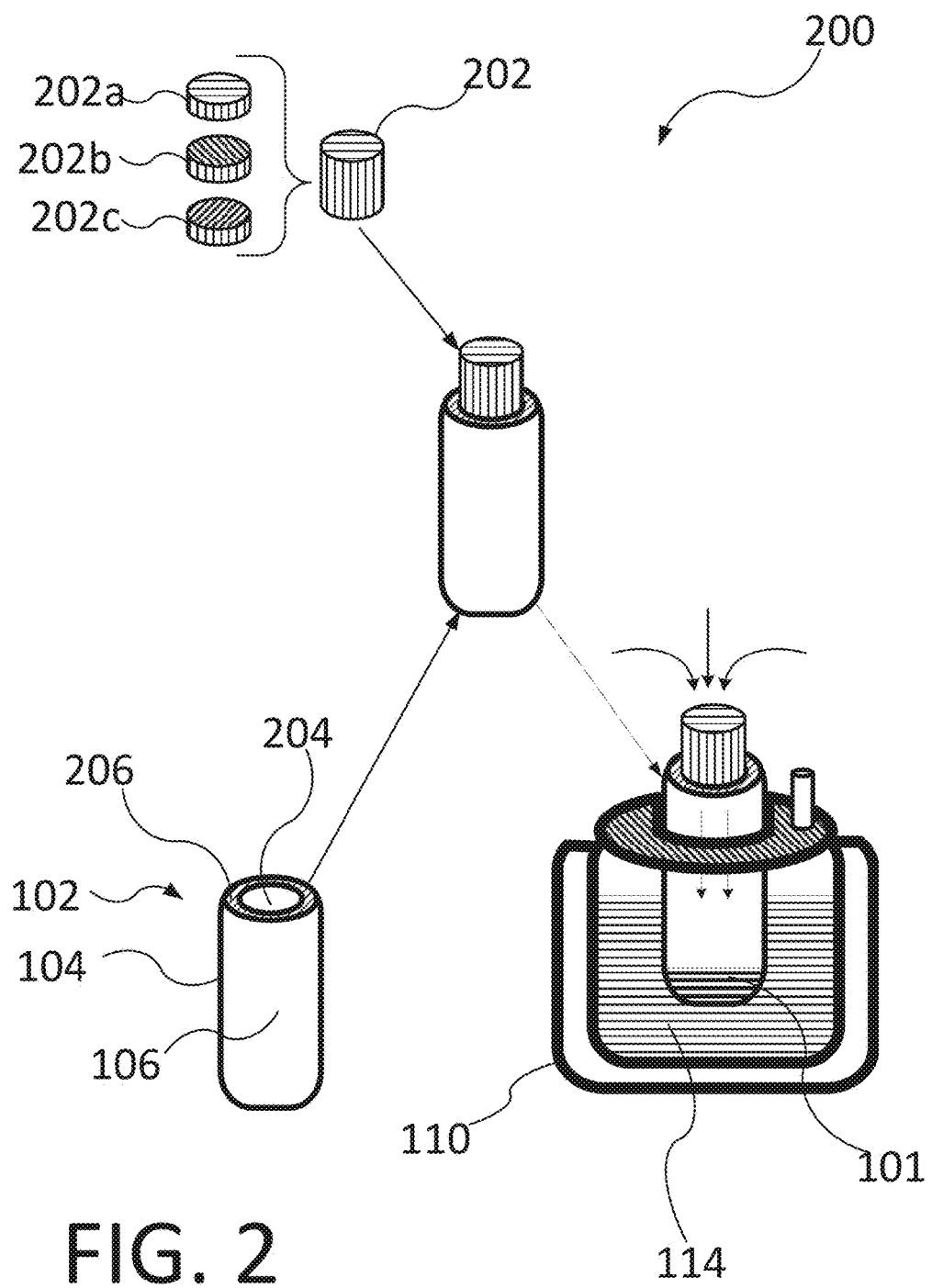
FIG. 2 schematically illustrates a device for producing liquid air, comprising a filter, according to certain embodiments of the invention.

FIG. 2 schematically illustrates a device 200 for producing liquid air, comprising a filter 202, according to certain embodiments of the invention. It should be noted that device 200 is an example of a device for producing liquid air, such as the device generally denoted 100 in FIG. 1. It should be further noted that FIGS. 1 and 2 illustrate common components, wherein a common component illustrated in FIG. 2 is considered to be a non-limiting example of the corresponding component in FIG. 1. In general, common elements may be denoted in both figures by the same reference numerals (e.g. 102 and 110) wherein the common component in FIG. 2 may be a similar or a different embodiment of the corresponding component previously mentioned with reference to FIG. 1. In some cases, a common component may be denoted in FIG. 2 by different reference numerals (e.g. 204) than the numerals used in FIG. 1 (e.g. 108), in order to indicate that one or more structural and/or functional aspects of embodiments of the common component described with reference to FIG. 2 do not necessary apply to embodiments of the corresponding common component described with reference to FIG. 1.

Filter 202 is configured to filter out relevant contaminants from outer air flowing into the first volume, thereby maintaining the inner air, and hence also the liquid air produced therefrom, sufficiently clean for the relevant application. In some embodiments, filter 202 comprises a known per se HEPA filter. Additionally or alternatively, in some embodiments filter 202 comprises a porous filter. In some embodiments, the porous filer is characterized by a pore size smaller or equal to 0.22 micrometer. In some embodiments, the porous filter comprises porous paper. Alternatively or additionally the porous filter may be a hydrophobic filter, such as Polytetrafluoroethylene (PTFE) or Gore-Tex filter, preventing water influx. However, these examples are not restricting, and any other porous filter suitable for the case may be implemented. Additionally or alternatively, in some embodiments filter 202 comprises an absorbing filter, which is configured to absorb dust and/or water vapor. In some embodiments, the absorbing filter comprises an absorbing material, such as an activated carbon, or paper, or any other absorbing material appropriate for the case. In some embodiments, filter 202 comprises a hydrophilic porous filter, for example a cellulose acetate (CA) membrane filter. In some embodiments, such as in the embodiment as illustrated in FIG. 2, filter 202 comprises a combination of several filters, while in the figure these are a HEPA filter 202a, a porous filter 202b, and an absorbing filter 202c. In such embodiments, filter 202 may be configured, e.g., so that HEPA filter 202a filters out dust, porous filter 202b filters out bacteria and fungi, and absorbing filter 202c filters out water droplets. It is noted that the above examples of filter 202 are not restricting, and any other filters or combinations thereof may be utilized. In some embodiments, filter 202 or components thereof may be disposable.

Additionally or alternatively to cleaning the outer air flowing into the first volume by filtering, in some embodiments the outer air may also be disinfected by applying UV irradiation, which is configured to kill microorganisms.

It is further noted that utilization of filter 202, as illustrated in FIG. 2, is not restricting. In some applications the outer air is sufficiently clean for the relevant application, and no filter is required, as illustrated in FIG. 1. In some applications, whereupon the device is located in a standard laboratory environment, in a laminar flow cabinet, or in a clean room, the outer air (the atmosphere of the laboratory, the laminar flow cabinet, or the clean room) may be sufficiently clean for the relevant application. In other applications, the first opening may be exposed to a clean environment, for example by a tube coupling it with a tube to a laminar flow cabinet.

Returning to FIG. 2, in some embodiments, filter 202 and first container are mutually configured so that the former fits into the latter, so as to substantially prevent auxiliary flow of unfiltered air into the first volume. The phrase "substantially prevent" means that either there is no auxiliary flow, or that the auxiliary flow is small enough so as not to impair the sufficient cleanness of the inner air. In some embodiments the first container comprises a filter adaptor 206, which is configured to fit the filter, thereby preventing auxiliary flow of outer air into the first volume. It is noted that FIG. 2 illustrates the filter adaptor in a schematically manner only, and the filter adaptor may be implemented in other forms, for example in a form of a sleeve configured to fit the first boundary and to fit the filter, or in any other form suitable for the case. In some embodiments filter adaptor 206 comprises silicon. However, this example is non-limiting, and filter-adaptor 206 may comprise e.g. rubber, PTFE, or any other material suitable for the case.

Moreover, it is noted that in some cases "preventing auxiliary flow of outer air into the first volume" may still allow flow of few particles that statistically do not harm the cleanliness of the inner air, i.e., a number of particles that are too few to contaminate the inner air. Hence, it may be considered that instead of "preventing" the term "substantially preventing" may be used.

Figure 3:
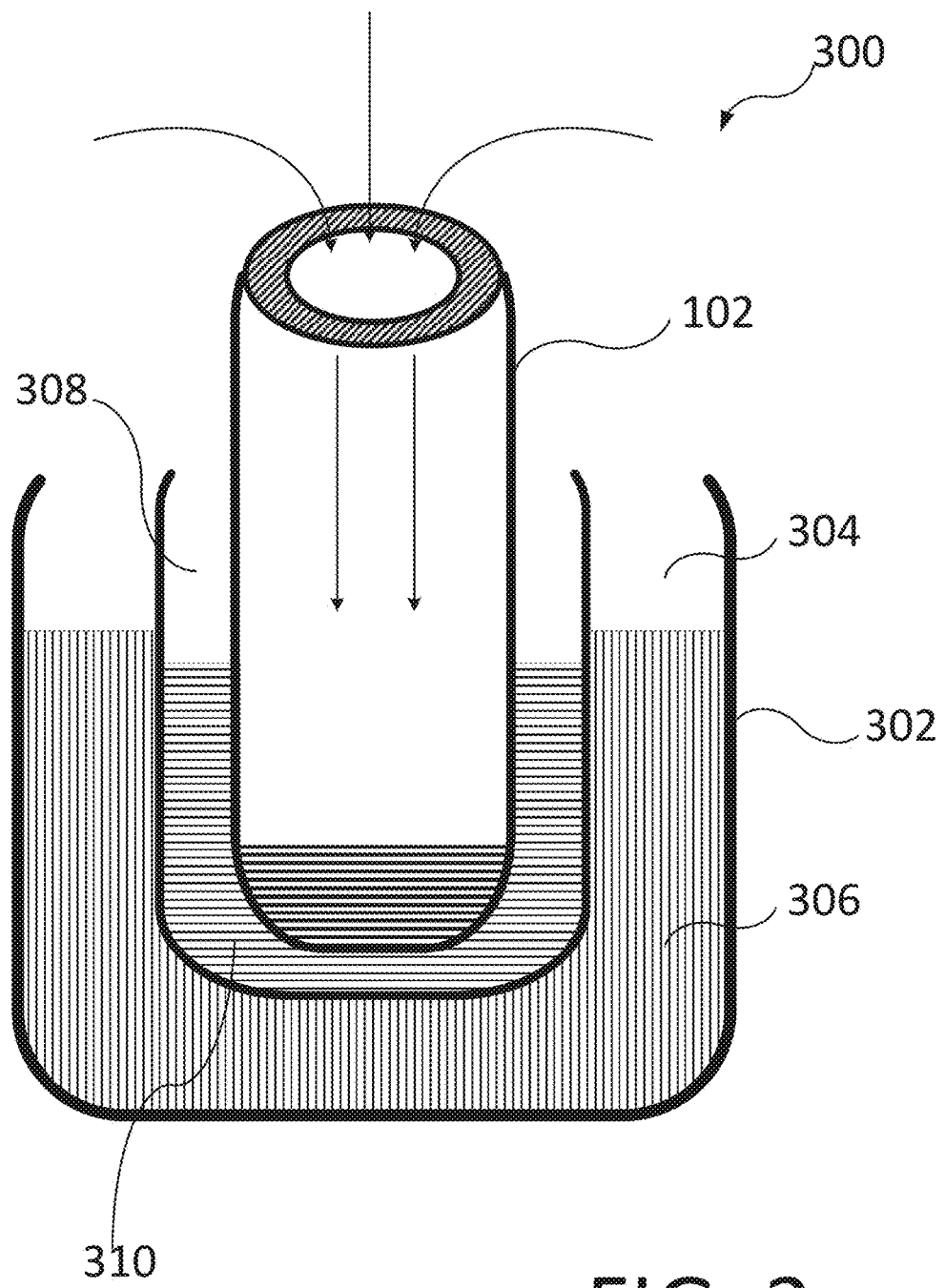
FIG. 3 schematically illustrates a device for producing liquid air, wherein second container further comprises a third volume, according to certain embodiments of the invention.

FIG. 3 schematically illustrates a device 300 for producing liquid air, wherein second container 302 comprises a third volume 304, according to certain embodiments of the invention. It should be noted that device 300 is an example of a device for producing liquid air, such as the device generally denoted 100 in FIG. 1, and additional or alternative examples may exist.

It should be further noted that FIGS. 1 and 3 illustrate common components, wherein a common component illustrated in FIG. 2 is considered to be a non-limiting example of the corresponding component in FIG. 1. In general, common elements may be denoted in both figures by the same reference numerals (e.g. 102) wherein the common component in FIG. 3 may be a similar or a different embodiment of the corresponding component previously mentioned with reference to FIG. 1. In some cases, a common component may be denoted in FIG. 3 by different reference numerals (e.g. 302) than the numerals used in FIG. 1 (e.g. 110), in order to indicate that one or more structural and/or functional aspects of embodiments of the common component described with reference to FIG. 2 do not necessary apply to embodiments of the corresponding common component described with reference to FIG. 1.

Appreciating that device 200 of FIG. 2 and device 300 of FIG. 3 are examples of device 100 of FIG. 1, it is noted that additional or alternative examples may combine structural and/or functional aspects from two or more or FIGS. 1, 2, and 3. For example, some embodiments may comprise a filter, as illustrated in FIG. 2, and a third volume, as illustrated in FIG. 3. This example is non-limiting though, and any other combinations appropriate for the case may be implemented.

According to the embodiment illustrated in FIG. 3, the second container is denoted 302. Second container 302 comprises a third volume 304, which is configured to contain a second cryogenic medium 306. Third volume 304 is thermally coupled to second volume 308, thus facilitating heat transfer from first cryogenic medium 310 to second cryogenic medium 306, thereby maintaining first cryogenic medium 310 at a low temperature. In some embodiments, first cryogenic medium 310 comprises liquid air, which is condensed and kept at liquid state due to a low temperature of second cryogenic medium 306. In some embodiments, second cryogenic medium 306 comprises liquid nitrogen. However, the above examples of cryogenic media are non-restricting, and any other cryogenic medium suitable for the case may be utilized.

Figure 4:
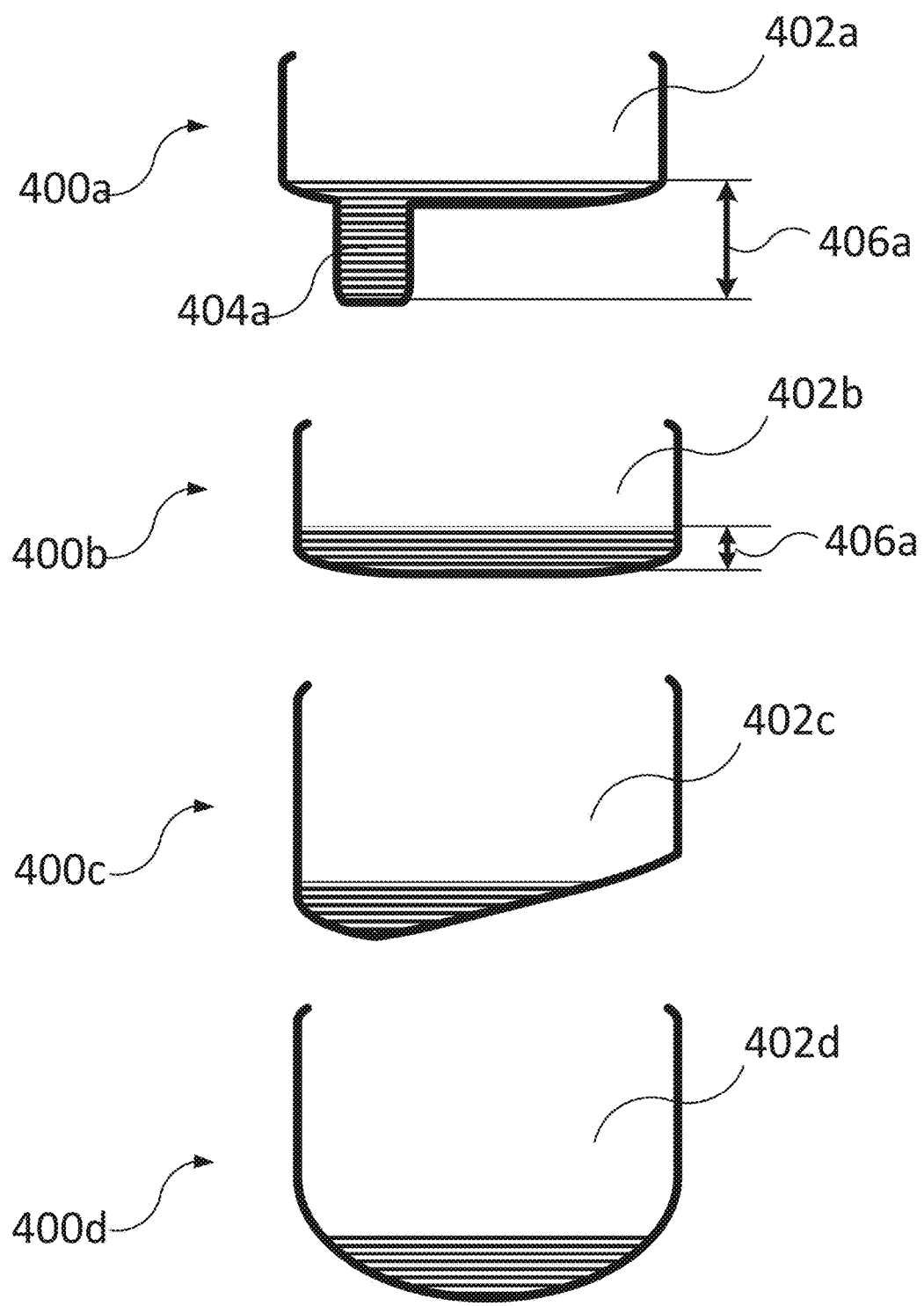
FIG. 4 schematically illustrates first containers comprising various first volumes, according to certain embodiments of the invention.

FIG. 4 schematically illustrates first containers 400a, 400b, 400c and 400d, comprising various first volumes 402a to 402d, respectively, according to certain embodiments of the invention. It should be noted that first containers 400a to 400d are examples for the first container, such as the one generally denoted 102 in FIG. 1, and additional or alternative examples may exist.

First volume 402a comprises a forth volume 404a, which is located at a low part of first volume 402a. Forth volume 404a is configured to accumulate the liquid air, in order to simplify utilization thereof. In some embodiments, such as the one illustrated in FIG. 4, fourth volume 404a is configured to comprise a horizontal cross section which is smaller than a horizontal cross section of first volume 402a, in order to increase a liquid air height 406a of the liquid air accumulated in first volume 402a.

However, the above two examples are not restricting, and other geometrical shapes of the first volume, such as first volumes 402c, which comprises a sloped floor, or first volume 402d, which comprises a concaved floor, or any other first volumes suitable for the case, may be implemented.

In some applications, the liquid air produced by the device may be utilized within the first container. In some applications, for example, the first container may be removed from the first cryogenic medium and taken into a clean environment, where the filter (if applicable) is removed from the first opening, and a biological sample is inserted into the liquid air residing within the first volume (or more specifically within the fourth volume, where applicable). Additionally or alternatively, in some applications the liquid air may be utilized within the first container without removing the first container from the first cryogenic medium. Additionally or alternatively, the liquid air may be poured from the first container into a third container, and utilized therein. However, in some embodiments the device is configured to facilitate retrieving the liquid air from the first container without removing thereof from the second container, as described in the following paragraph, with reference to FIG. 5.

FIG. 5 schematically illustrates a device 500 for producing liquid air, the device coupleable to a third container 502, according to certain embodiments of the invention. It should be noted that device 500 is an example of a device for producing liquid air, such as the device generally denoted 100 in FIG. 1, and additional or alternative examples may exist.

It should be further noted that FIGS. 1 and 5 illustrate common components, wherein a common component illustrated in FIG. 2 is considered to be a non-limiting example of the corresponding component in FIG. 1. In general, common elements may be denoted in both figures by the same reference numerals (e.g. 101) wherein the common component in FIG. 5 may be a similar or a different embodiment of the corresponding component previously mentioned with reference to FIG. 1. In some cases, a common component may be denoted in FIG. 5 by different reference numerals (e.g. 504) than the numerals used in FIG. 1 (e.g. 102), in order to indicate that one or more structural and/or functional aspects of embodiments of the common component described with reference to FIG. 5 do not necessary apply to embodiments of the corresponding common component described with reference to FIG. 1.

Appreciating that devices 200,300, and 500 of FIGS. 2, 3, and 5, respectively, are examples of device 100 of FIG. 1, and that first containers 400a to 400d of FIG. 4 are example for first container 102 of FIG. 1, it is noted that further examples may comprise structural and/or functional aspects from FIGS. 1 to 5. For example, some embodiments may comprise a forth volume, a sloped floor, or a concaved floor, as illustrated in FIG. 4, and be coupleable to a third container, as illustrated in FIG. 5. Those examples are non-limiting, though, and any other combinations appropriate for the case may be implemented.

According to the embodiments illustrated in FIG. 5, the first container is denoted 504, the first cryogenic medium is denoted 506, the first volume is denoted 515, the second container is denoted 516, and the first thermal isolation is denoted 522.

Device 500 is configured to transfer liquid air 101 from first container 504 to third container 502, while first container 504 is immersed in a first cryogenic medium 506. After being filled with liquid air, third container 502 may be decoupled from device 500 and carried independently of device 500. As one example, third container 502 may be taken to a laminar flow cabinet, where the liquid air residing therein may be used, e.g., for vitrification.

In some embodiments, third container 502 comprises a second thermal isolation 508 configured to reduce heat transfer from the surrounding environment into the liquid air residing within the third container, thus facilitates maintaining this liquid air at liquid state for a longer period. In some embodiments, second thermal isolation 508 comprises vacuum-based-isolation. However, this example is not restricting, and other thermal isolations, such as polystyrene foam, or any other thermal isolation suitable for the case, may be used.

It is appreciated that in some applications, third container 502 might potentially be contaminated during utilization thereof, thereby contaminating the liquid air residing therein. For example, in application where the liquid air is used for vitrification, third container 502 might potentially be contaminated by the vitrified sample, and might therefore contaminate the liquid air residing therein. Therefore, in some application, it is required to remove the relevant contaminators form the third container by cleaning and/or sterilization. In some embodiments third container 502 is cleanable, e.g. made of material that can be cleaned by washing, or by any other cleaning method suitable for the case. Additionally or alternatively, in some embodiments third container 502 is sterilizable, e.g. made of material that can be sterilized by steam or boiling water, or by any other sterilization method suitable for the case. In some embodiments, third container 502 is disposable, facilitating usage of new clean third container per operation.

In some embodiments, device 500 comprises a first outlet 510 configured to conduct the liquid air from first container 504 into third container 502. First outlet 510 comprises a proximal end 512 and a distal end 514. Distal end 514 is coupleable to third container 502, and proximal end 512 is coupled to first volume 515. In some embodiments (not illustrated in FIG. 5), where the first volume comprises a forth volume, proximal end 512 may be coupled to the fourth volume. In some embodiments (not illustrated in FIG. 5), where the first volume comprises a sloped floor, proximal end 512 may be coupled to the first volume at the vicinity of the lowest point of the floor. In some embodiments, device 500 is configured to facilitate locating third container 502 relatively low, so as to enable passive flow (due to gravitation) of the liquid air into the third container, as illustrated in FIG. 5.

In some embodiments, third container 502 resides outside second container 516, as illustrated in FIG. 5. In such embodiments, third container 502 is configured to facilitate placing the first outlet with proximal end 512 and distal end 514 residing inside and outside the second container, respectively. FIG. 5 schematically illustrates an embodiment wherein a second boundary 518 of second container 516 comprises a forth opening 520 configured to facilitate passage of first outlet 510 through the second boundary. FIG. 5 further schematically illustrates that first thermal isolation 522 of the second container (when applicable) also comprises a fifth opening 524 configured to facilitate passage of first outlet 510 through first thermal isolation 522.

As further illustrated in FIG. 5, when third container 502 resides outside second container 516, an external portion 526 of first outlet 510 may also resides outside second container 516, and may therefore be thermally coupled to the surrounding environment (e.g. the room atmosphere). In some embodiments, external portion 526 of first outlet 510 comprises a second thermal isolation (not shown in the figure), configured to reduce heat transfer from the surrounding environment into the liquid air flowing through the external portion. In some embodiments, the second thermal isolation comprises vacuum isolation. However, this example is not restricting, and other thermal isolation, such as polystyrene foam, or any other thermal isolation suitable for the case, may be implemented.

It is noted that third container 502 can be coupled to and decoupled from first outlet 510. Accordingly, first outlet 510 is configured for two states: a coupling state (i.e. when the first outlet is coupled to the third container) and a decoupling state (i.e. when the first outlet is decoupled from the third container). In some embodiments, first outlet 510 is coupleable to third container 502 by a first coupling mechanism (not shown in the figure), which is configured to maintain the first outlet and the third container isolated from an environment atmosphere during the coupling state, thereby preserving the cleanness of the liquid air within the first volume and within the third container. In some embodiments the first coupling mechanism comprises a sterile connection, such as Kleenpak™ Sterile Connector (KPC) by Pall Corporation. However, this example is not restricting, and other coupling mechanisms, such as a mechanic valve, or any other coupling mechanism suitable for the case, may be implemented.

In some applications first outlet 510 comprises a first flow control mechanism 528 configured for facilitating flow of liquid air from the first volume to the third volume during the coupling state, and preventing flow of liquid air from the first volume during the decoupling state. In some embodiments, first flow control mechanism 528 is further configured to facilitate isolating the first volume from the environmental atmosphere during the decoupling state. In some embodiments, first flow control mechanism 528 is a tap, as illustrated in FIG. 5. In other embodiments, first flow control mechanism is a cork, e.g. a rubber cork. In some embodiments, first flow control mechanism, e.g. the cork, may be disposable. However, those examples are not restricting, and other flow control mechanism, such as a one-way valve, or any other flow control mechanism suitable for the case, may be implemented.

In some embodiments, third container 502 is substantially closed. It is noted that in such embodiments a pressure of gas inside the third container might increase due to the liquid air flowing therein, and/or due to evaporation of a portion of the liquid air residing therein. It is further noted that increased gas pressure inside the third container might slow down or even prevent the flow of the liquid air into the third container. Therefore, in some embodiments, third container 502 comprises a third outlet 530, which is configured to facilitate one-way flow of gas out of the third container, thereby preventing accumulation of gas pressure inside the third container. In some embodiments, third outlet 530 comprises a one-way valve configured to facilitate flow of gas out of the third container, while preventing flow of gas from the surrounding environment into the third container.

Returning to FIG. 1, it is appreciated that in some applications, the first container might potentially get contaminated during utilization thereof, thereby contaminating the liquid air therein. For example, in applications where a biological sample is inserted into the liquid air residing within the first container (e.g. for vitrification), the first container might potentially be contaminated by the biological sample, and might therefore contaminate the liquid air residing therein. Therefore, in some applications it is required to remove the relevant contaminators form the first container by cleaning and/or by sterilization. In some embodiments the first container is cleanable, e.g. made of material that can be cleaned by washing, or by any other cleaning method suitable for the case. Additionally or alternatively, in some embodiments the first container is sterilizable, e.g. made of material that can be sterilized by steam or boiling water, or by any other sterilization method suitable for the case. In some embodiments, the first container is disposable, facilitating usage of new clean first container per operation.

Following the above description of devices for producing liquid air, the paragraphs below describes various embodiments of a method for the production of liquid air, according to certain embodiments of the invention.

A method for producing liquid air, briefly referred herein as "the method", comprises bringing a first container confining an unpressurised first volume coupled to outer air in contact with a first cryogenic medium and maintaining a temperature of the first cryogenic medium substantially higher than the boiling temperature of the first cryogenic medium for affecting continuous production of liquid air. It was previously explained that in order to maintain continuous production of liquid air the cryogenic media should be maintained boiling, while "continuous production" means production which lasts long enough to allow accumulation of liquid air, that is, 2-3 seconds and longer. If the temperature is lowered and boiling stops, the production continues, although it may be restarted again.

According to embodiments of the invention, a method is described ("the latter method"), comprising maintaining a first volume coupled to outer air, i.e. air that is external to a first container, where the first container confines the first volume. The latter method further comprises bringing the first container in contact with a first cryogenic medium, thereby producing liquid air by condensing a portion of inner air, i.e. air that is internal to the first volume. Various aspects of the latter method and embodiments thereof are described in depth above, with reference to FIGS. 1 to 5.

As described above, with reference to FIG. 1, the latter method facilitates production of liquid air while a cryogenic temperature of the first cryogenic medium is higher than a boiling temperature of helium, and a pressure of the internal air is substantially equal to, or lower than, an environmental atmospheric pressure. In some embodiments the latter method facilitates producing an amount of at least 10 milliliter of liquid air within 10 minutes. In some embodiments, the latter method facilitates producing an amount of at least 10 milliliter of liquid air within 10 minutes, wherein the cryogenic temperature is equal to or higher than a melting temperature of nitrogen. In some embodiments, the latter method facilitates producing an amount of at least 10 milliliter of liquid air within 10 minutes, while a temperature of the first cryogenic medium is higher than or equal to a boiling temperature of nitrogen. In some embodiments, the latter method comprises producing an amount of at least 20 milliliter of liquid air within 10 minutes, while a temperature of the first cryogenic medium is higher than or equal to a boiling temperature of nitrogen. In some embodiments, the latter method comprises producing an amount of at least 50 milliliter of liquid air within 10 minutes, while a temperature of the first cryogenic medium is higher than or equal to a boiling temperature of nitrogen.

In some embodiments, the cryogenic medium utilized for the latter method comprises liquid nitrogen. However, those examples are not-restricting, and other suitable cryogenic media, for example super cooled liquid nitrogen, may be utilized.

In some embodiments, the latter method comprises cleaning and/or sterilizing the first container. In some embodiments the latter method comprises disposing the first container.

As further described with reference to FIG. 1, in some embodiments the latter method comprises holding the first cryogenic medium in a second container. In some embodiments the latter method comprises thermally isolating the second container. In some embodiments the latter method comprises maintaining the second container substantially closed. In some embodiments the latter method further comprises facilitating flow of gas from the second container. In some embodiments the latter method comprises immersing the first container in the cryogenic medium by inserting the first container in a second opening of second container.

As described in depth with reference to FIG. 2, in some embodiments the latter method further comprises filtering out contaminating elements from the outer air flowing into the first volume. In some embodiments filtering comprises filtering by a HEPA filter. In some embodiments filtering comprises filtering by a porous filter. In some embodiments the porous filter comprises porous paper. In some embodiments a pore size of the porous filter is 0.22 micrometer. In some embodiments filtering comprises filtering by an absorbing filter. In some embodiments the absorbing filter comprises an absorbing material. In some embodiments the absorbing material comprises activated carbon. In some embodiments the absorbing material comprises paper. However, those examples are not restricting, and any other absorbing filter suitable for the case may be utilized. In some embodiments, filtering comprises filtering by an HEPA filter, a porous filter, and an absorbing filter. It is noted that the above examples of filtering are not restricting, and other embodiments may utilize other filters or combinations thereof. In some embodiments, filtering may comprise utilization of disposable filters. Additionally or alternatively to filtering, the latter method may also comprise disinfecting the outer air flowing into the first volume by UV irradiation.

As was previously noted, filtering is not-restricting. As described above with reference to FIG. 2, in some applications, the outer air is sufficiently clean for the relevant application, and no filtering is required.

In some embodiments filtering comprises mutually configuring the filter and the first opening so that the former fits into the latter, so as to substantially prevent auxiliary flow of unfiltered air into the first volume.

As described in depth with reference to FIG. 5, in some embodiments the latter method further comprises transferring the liquid air from the first container to a third container, while the first container is immersed in the first cryogenic medium. In some embodiments the latter method comprises thermally isolating the third container. In some embodiments the latter method comprises cleaning and or sterilizing the third container. In some embodiments the latter method comprises disposing the third container. In some embodiments transferring the liquid air comprises conducting the liquid air via a first outlet. In some embodiments conducting the liquid air comprises facilitating passive flow of the liquid air to the third volume due to gravitation. In some embodiments conducting the liquid air comprises conducting while the third container resides outside the second container. In some embodiments method comprises coupling the first outlet to the third container by a first coupling mechanism configured to maintain the first outlet and the third container isolated from an environment atmosphere during a coupling state, when the first outlet is coupled to the third container. In some embodiments the latter method further comprises facilitating flow of liquid air from the first volume to the third container during a coupling state, when the first outlet is coupled to the third container, and preventing flow of liquid air from the first volume during a decoupling state, when the first outlet is not coupled to the third container. In some embodiments, the latter method further comprises isolating the first volume from an environment atmosphere during a decoupling state, when the first outlet is not coupled to the third container. In some embodiments the latter method comprises facilitating flow of gas out of the third container.

As noted above, the invention disclosed herein facilitates production of liquid air which is cleaner than the cryogenic media utilized for the production thereof. This capability was examined by the following experience, which compared the content of two sterile cups containing 100 milliliter of liquid air produced by an experimental device (samples A and B), with the content of two sterile cups of containing similar amount of commercial liquid nitrogen (samples C and D). The dimensions of first container of the experimental device were about 170 by 320 by 150 millimeter, and the device comprised an 0.22 micron porous filter, with diameter of a about 70 millimeter. The output capacity of the experimental device was about 100 milliliter in 7 minutes.

Results of a microbiological (bio-burden) test applied to the four samples, performed by a qualified microbiological laboratory, revealed present of bacterium, yeast and molds in samples C and D, and no contamination in samples A and B. Those results demonstrated the capability of devices and methods according to certain embodiments of the invention to produce liquid air which is cleaner than the cryogenic media utilized for the production thereof.

Further to understanding the embodiments described so far, it should be appreciated that it is possible to place the device in an environment containing an alternative gas to air, thus liquidizing that gas. For example, by placing the device in environment including pure oxygen, liquid oxygen would be produced. By placing the device in an environment including nitrogen, it will produce liquid nitrogen, etc.

Furthermore, it should be appreciated that the first cryogenic medium may boil and evaporate by time, wherein its level, or amount in the device is reduced, while at some point the level would become too low to maintain enough boiling for affecting continuous production of liquid air. Therefore, according to some embodiments it is possible to maintain the level of the first cryogenic medium sufficient for affecting continuous production of liquid air, e.g., by supplementing first cryogenic medium, e.g., from a container external to the device and coupleable thereto.

It is therefore possible to summarize that the invention, in some embodiments thereof, relates to a device for producing liquid air, the device comprises a first container comprising a first boundary confining a first volume, the first boundary configured to conduct heat from an inner side of the first boundary to an outer side thereof; and a first opening coupling the first volume with outer air external to the first volume, the first opening is configured to allow flow of outer air into the first volume; the device is configured to facilitate producing an amount of at least 10 milliliter of liquid air within 10 minutes, by bringing the first container in contact with a first cryogenic medium, while a cryogenic temperature of the first cryogenic medium is higher than a boiling temperature of helium, thereby condensing a portion of inner air internal to the first volume, while a pressure of the internal air is substantially not higher than a standard atmospheric pressure.

The invention, in some embodiments thereof, relates to a device for producing liquid air, the device comprises a first container comprising: a first boundary confining a first volume, the first boundary configured to conduct heat from an inner side of the first boundary to an outer side thereof; and a first opening coupling the first volume with outer air external to the first volume, the first opening is configured to allow flow of outer air into the first volume; the device further comprises a second container comprising a second volume configured to contain the first cryogenic medium; the device is configured to condense a portion of inner air internal to the first volume, while a pressure thereof is substantially not higher than a standard atmospheric pressure, by bringing the first container in contact with a first cryogenic medium, while a cryogenic temperature thereof is higher than a boiling temperature of helium.

The invention, in some embodiments thereof, relates to a device for producing liquid air, the device comprises a first container comprising: a first boundary confining a first volume, the first boundary configured to conduct heat from an inner side of the first boundary to an outer side thereof; and a first opening coupling the first volume with outer air external to the first volume, the first opening is configured to allow flow of outer air into the first volume; the device further comprises a filter configured to filter out contaminating elements from the outer air flowing into the first volume; the device is configured to condense a portion of inner air internal to the first volume, while a pressure thereof is substantially not higher than a standard atmospheric pressure, by bringing the first container in contact with a first cryogenic medium, while a cryogenic temperature thereof is higher than a boiling temperature of helium.

In some embodiments, the device is capable of producing an amount of at least 10 milliliter of liquid air within 10 minutes, wherein the cryogenic temperature is equal to or higher than a melting temperature of nitrogen.

In some embodiments, the device is capable of producing an amount of at least 10 milliliter of liquid air within 10 minutes, wherein the cryogenic temperature is equal to or higher than a boiling temperature of nitrogen.

In some embodiments, the device is capable of producing an amount of at least 20 milliliter of liquid air within 10 minutes, wherein the cryogenic temperature is equal to or higher than a boiling temperature of nitrogen.

In some embodiments, the device is capable of producing an amount of at least 50 milliliter of liquid air within 10 minutes, wherein the cryogenic temperature is equal to or higher than a boiling temperature of nitrogen.

In some embodiments, the device is capable of producing liquid air which is cleaner than the cryogenic media.

In some embodiments, the filter comprises a HEPA (High Efficiency Particulate Air) filter.

In some embodiments, the filter comprises a porous filter.

In some embodiments, the porous filter comprises porous paper.

In some embodiments, a pore size of the porous filter is 0.22 micrometer.

In some embodiments, the filter comprises an absorbing filter.

In some embodiments, the absorbing filter comprises an absorbing material.

In some embodiments, the absorbing material comprises paper.

In some embodiments, the filter comprises an HEPA filter, a porous filter, and an absorbing filter.

In some embodiments, the filter and the first container are mutually configured so that the former fits into the latter, thereby substantially preventing auxiliary flow of unfiltered air into the first volume.

In some embodiments, the first container comprises a filter adaptor configured to fit the filter.

In some embodiments, the first container comprises a filter adaptor configured to fit the filter.

In some embodiments, the filter adaptor comprises silicon.

In some embodiments, the first container is cleanable.

In some embodiments, the first container is sterilizable.

In some embodiments, the first container is disposable.

In some embodiments, the first cryogenic medium comprises liquid nitrogen.

In some embodiments, the first cryogenic medium comprises liquid air.

In some embodiments, the first boundary comprises metal wall.

In some embodiments, the first boundary comprises steel wall.

In some embodiments, the device further comprises a second container comprising a second volume configured to contain the first cryogenic medium.

In some embodiments, the second container is thermally isolated.

In some embodiments, the second container comprises a first thermal isolation configured to reduce heat transfer from a surrounding environment into the first cryogenic medium.

In some embodiments, the second isolation comprises vacuum.

In some embodiments, the second isolation comprises polystyrene foam.

In some embodiments, the second volume is substantially closed.

In some embodiments, the second container comprises a second outlet configured to facilitate flow of gas from the second container.

In some embodiments, the second container comprises a second opening configured to facilitate inserting the first container therein, thereby immersing the first container in the cryogenic medium.

In some embodiments, the first volume comprises a forth volume at a lower part thereof, the forth volume configured to accumulate the liquid air.

In some embodiments, the device is coupleable to a third container, and is configured to transfer the liquid air from the first container to the third container, while first container is immersed in the first cryogenic medium.

In some embodiments, the third container comprises a second thermal isolation configured to reduce heat transfer from a surrounding environment into liquid air residing within the third container.

In some embodiments, the third container is cleanable.

In some embodiments, the third container is sterilizable.

In some embodiments, the third container is disposable.

In some embodiments, the device comprises a first outlet comprising a proximal end coupled to the first volume and a distal end coupleable to the third container, the first outlet configured to conduct the liquid air from the first container into the third container.

In some embodiments, the device is configured to facilitate passive flow of the liquid air to the third volume due to gravitation.

In some embodiments, the third container resides outside the second container.

In some embodiments, the second container is configured to facilitate placing the proximal and distal ends residing inside and outside the second container, respectively.

In some embodiments, an external portion of the first outlet residing outside the second container comprises a third thermal isolation, configured to reduce heat transfer from a surrounding environment into the liquid air flowing through the external portion.

In some embodiments, the first outlet is coupleable to the third container by a first coupling mechanism configured to maintain the first outlet and the third container isolated from an environment atmosphere during a coupling state.

In some embodiments, the first coupling mechanism comprises a sterile connection In some embodiments, the first outlet comprises a first flow control mechanism configured for facilitating flow of liquid air from the first volume to the third container during the coupling state, and preventing flow of liquid air from the first volume during the decoupling state.

In some embodiments, the first flow control mechanism is further configured to facilitate isolating the first volume from an environment atmosphere during a decoupling state.

In some embodiments, the first flow control mechanism is further configured to facilitate isolating the first volume from an environment atmosphere during a decoupling state.

In some embodiments, the first flow control mechanism is a tap.

In some embodiments, the first flow control mechanism is a cork.

In some embodiments, the first flow control mechanism is a one-way valve.

In some embodiments, the third container comprises a third outlet configured to facilitate one-way flow of gas out of the third container.

The invention, in some embodiments thereof, relates to a method for producing liquid air, the method comprising: maintaining a first volume coupled to outer air external to a first container, the first container confining the first volume; and producing liquid air by bringing the first container in contact with a first cryogenic medium, while a cryogenic temperature of the first cryogenic medium is higher than a boiling temperature of helium, thereby liquefying a portion of inner air internal to the first volume, while a pressure of the internal air is substantially equal to or lower than a standard atmospheric pressure.

In some embodiments, the method facilitates production of an amount of at least 10 milliliter of liquid air within 10 minutes.

In some embodiments, the method facilitates production of an amount of at least 10 milliliter of liquid air within 10 minutes, wherein the cryogenic temperature is equal to or higher than a melting temperature of nitrogen.

In some embodiments, the method facilitates production of an amount of at least 10 milliliter of liquid air within 10 minutes, while a temperature of the first cryogenic medium is higher than or equal to a boiling temperature of nitrogen.

In some embodiments, the method facilitates production of an amount of at least 20 milliliter of liquid air within 10 minutes, while a temperature of the first cryogenic medium is higher than or equal to a boiling temperature of nitrogen.

In some embodiments, the method facilitates production of an amount of at least 50 milliliter of liquid air within 10 minutes, while a temperature of the first cryogenic medium is higher than or equal to a boiling temperature of nitrogen.

In some embodiments, the method further comprises cleaning the first container.

In some embodiments, the method further comprises sterilizing the first container.

In some embodiments, the method further comprises disposing the first container.

In some embodiments, the first cryogenic medium comprises liquid nitrogen.

In some embodiments, the first cryogenic medium comprises liquid air.

In some embodiments, the method further comprises holding the first cryogenic medium in a second container.

In some embodiments, the method further comprises filtering out contaminating elements from the outer air flowing into the first volume.

In some embodiments, filtering comprises filtering by a HEPA filter.

In some embodiments, filtering comprises filtering by a porous filter

In some embodiments, filtering comprises filtering by a porous filter.

In some embodiments, filtering comprises filtering by an absorbing filter.

In some embodiments, filtering comprises filtering by an HEPA filter, a porous filter, and an absorbing filter.

In some embodiments, the method further comprises substantially preventing auxiliary flow of unfiltered air into the first volume.

In some embodiments, the method further comprises transferring the liquid air from the first container to a third container, while the first container is immersed in the first cryogenic medium.

In some embodiments, the method further comprises thermally isolating the third container.

In some embodiments, the method further comprises cleaning the third container.

In some embodiments, the method further comprises sterilizing the third container.

In some embodiments, the method further comprises disposing the third container.

In some embodiments, transferring the liquid air comprises facilitating passive flow of the liquid air to the third volume due to gravitation.

Although various embodiments of the present invention have been described above, these are only given for the purposes of explanation of the present invention, and the range of the present invention is not to be considered as being limited only to these embodiments. Provided that the gist of the present invention is not departed from, it would also be possible to implement the present invention in various other manners.

What is claimed is:

1. A device for continuously producing liquid air from uncompressed outer air in atmospheric pressure, the device comprising:

a first container having a first boundary having high thermal conductivity and a first opening;

the first boundary confines an uncompressed first volume and is configured to conduct heat from an inner side of the first boundary to an outer side thereof, thereby to cool inner air confineable in the first volume;

the first opening is configured to couple the first volume with the outer air external to the first volume, the first opening is further configured to allow the uncompressed outer air to flow into the first volume;

the first container is configured to remain open to outer air and configured to keep internal pressure of the inner air not higher than the atmospheric pressure, without actively compressing the inner air; and a second container comprising a second volume configured to contain liquid nitrogen and to have the first container partially immersed in the liquid nitrogen for bringing the first container in thermal contact with the liquid nitrogen, thereby passively cooling the first container, the first container remaining open during immersion in liquid nitrogen;

the second container having a holding mechanism for engaging and holding the first container so a distal region of the first container remains immersed to counter a buoyancy force, wherein the holding mechanism comprises a first edge on the second container configured to apply pressure on the first boundary, the holding mechanism is in the form of an elastic member configured to fit the first boundary of the first container by adjusting an internal contour of the first edge to an external contour of the first boundary, wherein the first opening of the first container is at a proximal end and the first opening and a proximal region of the first container is positioned external of the second container while the distal region of the first container is immersed in the second container;

a filter fitting into the first opening of the first container and protruding proximally of the container so a proximalmost end of the filter is spaced from a proximalmost edge of the first container and spaced from a proximalmost edge of the second container and exposed to outer air, the filter configured to clean the outer air flowing into the first volume via the first opening from contaminants, the filter enabling subsequent vitrification of a human reproductive sample within the first container, the filter including a combination of a HEPA filter to filter out dust, a porous filter to filter out bacteria and fungi and an absorbing filter to filter out water droplets;

a filter adaptor including a sleeve configured to fit in the first boundary and to fit the filter to prevent flow of unfiltered outer air into the first volume, the filter extending proximally of the filter adaptor;

wherein the device is configured to continuously produce the liquid air, from passive flow of the uncompressed outer air into the first volume, by passively cooling the inner air, thereby passively condensing a portion of the inner air to yield the liquid air, thereby producing liquid air cleaner than the liquid nitrogen, the produced liquid air capable of preserving the human reproductive sample for vitrification.

2. The device of claim 1, wherein the device is configured to store the liquid nitrogen in the second container in a cryogenic temperature that allows the liquid nitrogen to boil; where the cryogenic temperature is below boiling temperature of air.

3. The device of claim 1, wherein the device is coupleable to a third container, and is configured to transfer the liquid air from the first container into the third container, while the first container is immersed in the liquid nitrogen.

4. The device of claim 3, further comprising a first outlet which is coupled to the first volume and is coupleable to the third container; the first outlet is configured to transfer the liquid air from the first container into the third container.

5. The device of claim 1, wherein the filter is a 0.22 micrometer hydrophobic filter.

6. The device of claim 1, wherein the second container comprises a second opening configured to facilitate inserting the first container into the second container, thereby immersing the first container in the liquid nitrogen.

7. The device of claim 1, wherein the second container comprises a first thermal isolation configured to reduce heat transfer from a surrounding environment into the liquid nitrogen.

8. The device of claim 1, wherein the second container comprises a second outlet configured to facilitate flow of gas from the second container.

9. The device of claim 1, wherein the second container is permanently coupled to the first container, so as to immerse the first container in the liquid nitrogen while the first opening is open to the outer air.

10. The device of claim 1, wherein the device is configured to produce at least 10 milliliter of liquid air within 10 minutes.

11. The device of claim 1, wherein the device is configured to produce at least 20 milliliter of liquid air within 10 minutes.

12. The device of claim 1, wherein the device is configured to produce at least 50 milliliter of liquid air within 10 minutes.

13. The device of claim 1, wherein the second container comprises a thermal isolation having a vacuum based isolation formed by first and second layers separated by a gap which is partially evacuated of air.

14. The device of claim 1, wherein the container is composed of a sterilizable material.

15. The device of claim 1, wherein the first boundary comprises a metal wall which is 1 millimeter thick, the first container has a shape of a rectangular cuboids of 100 by 150 by 140 millimeter, wherein the 140 millimeters is a height of the metal wall.

16. The device of claim 1, wherein the first container has a height extending from the first opening to the distal region, a transverse dimension of the first container being constant along the height so that the transverse dimension at the proximal region is external the second container and the transverse dimension at the distal region is within the second container.

17. The device of claim 1, wherein the HEPA filter, the porous filter and the absorbing filter are placed in a stacked abutting relationship.

18. The device of claim 1, wherein a distal end of the HEPA filter and a distal end of the porous filter are spaced proximally from the filter adaptor.

19. The device of claim 1, wherein a first part of the first container protrudes out of the second container and a second part of the first container is positioned within the second container, wherein the first and second parts have the same diameter.

* * * * *